US006615681B1

(12) United States Patent
Jenkins et al.

(10) Patent No.: US 6,615,681 B1
(45) Date of Patent: Sep. 9, 2003

(54) HYBRID WAFER GYROSCOPE

(75) Inventors: Lyle J. Jenkins, Scituate, MA (US); Ralph E. Hopkins, Chestnut Hill, MA (US); Kaplesh Kumar, Wellesley, MA (US); Paul Greiff, Wayland, MA (US); Edmund R. Foster, Cotuit, MA (US); Richard M. Walker, Webster, MA (US); Richard H. Coco, Reading, MA (US); Anthony M. Moscaritolo, Saugus, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/916,020

(22) Filed: Jul. 26, 2001

Related U.S. Application Data

(60) Provisional application No. 60/221,324, filed on Jul. 28, 2000.

(51) Int. Cl.⁷ .............................................. G01C 19/30
(52) U.S. Cl. .............................. 74/5.46; 74/5 F; 74/5.7
(58) Field of Search ....................... 74/5.46, 5 F, 5.6 D, 74/5.6 E, 5.7

(56) References Cited

U.S. PATENT DOCUMENTS

| | | | | |
|---|---|---|---|---|
| 3,845,995 A | * | 11/1974 | Wehde .................. | 310/156.05 |
| 3,943,778 A | * | 3/1976 | Wyse ......................... | 29/445 |
| 3,987,555 A | * | 10/1976 | Haagens et al. .............. | 33/324 |
| 4,062,600 A | * | 12/1977 | Wyse ......................... | 384/205 |
| 4,290,316 A | * | 9/1981 | Noar et al. ................. | 74/5.46 |
| 4,297,904 A | * | 11/1981 | Morton ....................... | 29/434 |
| 4,305,304 A | * | 12/1981 | Jessup et al. ................ | 74/5.12 |
| 4,316,394 A | * | 2/1982 | Dohogne ................... | 310/90.5 |
| 4,528,864 A | * | 7/1985 | Craig ........................... | 74/5 F |
| 4,563,909 A | | 1/1986 | Carroll et al. | |
| 5,016,072 A | * | 5/1991 | Greiff ........................ | 257/418 |
| 5,650,568 A | * | 7/1997 | Greiff et al. ............. | 73/504.09 |
| 5,725,729 A | * | 3/1998 | Greiff ......................... | 216/11 |
| 5,761,225 A | * | 6/1998 | Fidric et al. .................. | 372/6 |

* cited by examiner

*Primary Examiner*—Richard M. Lorence
*Assistant Examiner*—David D. Le
(74) *Attorney, Agent, or Firm*—McDermott, Will & Emery

(57) ABSTRACT

A hybrid wafer gyroscope includes a combination of micromachined components and traditional electromechanical components to form a miniature gyroscope having a high degree of stability. The gyroscope includes a rotor, gimbal, flexures, and stop cutouts micro-machined out of one or more layers of silicon, forming a unitary, planar, and disk-shaped rotor subassembly, which spins about a drive shaft.

31 Claims, 14 Drawing Sheets

US 6,615,681 B1

HYBRID WAFER GYROSCOPE

CROSS REFERENCE TO RELATED APPLICATIONS

This application claims benefit of priority from U.S. Provisional Patent Application Ser. No. 60/221,324, filed Jul. 28, 2000, entitled HYBRID WAFER GYROSCOPE.

FIELD OF THE INVENTION

The invention relates to gyroscopes, and more particularly to miniature gyroscopes having a high degree of bias stability, for example, having a stability of up to about 0.005 degrees/hour.

BACKGROUND OF THE INVENTION

Gyroscopes, or "gyros", are used in many systems that require, as an example, an inertial guidance system. A significant feature of a gyroscope is that the momentum and the rotational axis of a gyroscope rotor generally preserve their direction in inertial space. Due to its ability to maintain the direction of its axis constant in space, the gyroscope can suitably be used for the stabilization of movements, that is, for maintaining an object in an orientation which is angularly fixed in inertial space. There are several classes of gyroscopes, for example, a floated single degree of freedom electro-mechanical gyroscope, an electrostatic gyroscope, a ring laser gyroscope, a tuning fork gyroscope, a fiber optic gyroscope, and a dry dynamically tuned gyroscope (DTG) having two degrees of freedom, but the basic functional characteristics of a gyroscope are common to all types.

A typical mechanical DTG is disclosed in U.S. Pat. No. 4,563,909 ('909) to Carroll et al. and shown herein in prior art FIGS. 1A–1C as an example of such devices. As shown in FIG. 1A–1C, a typical DTG 10 includes a drive shaft 14 which centers and rotates a gimbal 28 which in turn centers and rotates a rotor 20. The drive shaft 14 is driven by a motor 16 under control of an electrical controller 42 and rotates about a longitudinal drive shaft spin axis (or Z-axis) 18, also referred to as a spin reference axis. Gimbal 28 is attached to drive shaft 14 via a gimbal shaft that defines a gimbal-shaft pivot axis (or X-axis) 32. Similarly, rotor 20 is attached to gimbal 28 via a rotor shaft that defines a gimbal-rotor pivot axis (or Y-axis) 30. When tuned, gimbal 28 experiences a rotation about gimbal-shaft pivot X-axis 32 in response to a Y-axis component associated with the drive shaft 14 being displaced from a vertical Z-axis orientation. And, when tuned, rotor 20 experiences a rotation about gimbal-rotor Y-axis 30 in response to an X-axis component associated with drive shaft 14 being displaced from a vertical Z-axis orientation. The intersection of the X, Y, and Z axes is referred to as the pivot point 36 of the gyroscope. Rotor 20 spins about a rotor-spin axis 22. When there is no displacement of drive shaft 14 in inertial space the rotor spins about and within a plane which is orthogonal to the spin reference Z-axis, but when a drive shaft displacement does occur, the rotor-spin axis shifts to remain orthogonal to the plane within which the rotor spins.

As shown in FIGS. 1B and 1C, gyroscope 10 also includes a case 12 which substantially encases the other gyroscope components. Motor 16, which rotates the drive shaft of the '909 gyroscope, is secured between case 12 and drive shaft 14. A set of bearings 15 is disposed between case 12 and drive shaft 14 and maintains the orientation of the drive shaft relative to the case, while also facilitating rotation of drive shaft 14, gimbal 28, and rotor 20. Drive shaft 14 is supported on a ball bearing (not shown) and spun by the electromagnetic drive motor 16. Change in rotor position with respect to the case 12 results when an angular force input along the DTG's two mutually orthogonal axes 30 and 32 (i.e., X and Y-axes), which are normal to the spin reference axis 18 (Z-axis). Rotor position is sensed with a pick-off, and the rotor is re-balanced back to its null position using a torquer and control electronics 42, in a closed loop operation.

A typical DTG is a two degree of freedom device, like that of FIGS. 1A–1C. The rotor 20 is attached to the drive shaft 14 through a universal joint hinge-gimbal assembly that provides the two rotational degrees of freedom of rotor 20 and gimbal 28 with respect to the drive shaft 14, wherein drive shaft 14 is fixed in position relative to case 12. The hinge stiffness of the flexures and gimbal inertias are sized to provide a dynamic decoupling of rotor 20 and shaft 14 when the assembly is spun at the gyroscope "tuned" speed. Gyroscope tuning permits the instrument to function as a "free rotor gyroscope". A free rotor gyroscope is one in which the static torque of the flexures is canceled by the dynamic torque of the gimbal.

A common measure of the performance of a gyroscope is its stability, which may be measured in degrees/hour. The smaller the measure of degrees/hour, the more stable the gyroscope and the better its performance. The DTG 2000, a product of Litton Corporation, Woodland Hills, Calif., is a typical example of the state of the art in electro-mechanical DTGs. Such a device can cost several thousands of dollars and has a range of performance (or stability) of about 0.1 degree/hour. A considerable cost of the assembled instrument is in the fabrication and tuning of the rotor with thin flexures; thin flexures are less stiff, thus allow a lower tuned speed of the gyroscope. A lower tuned speed is generally desirable because it requires less energy input to the gyroscope to achieve the desired free rotor condition. Some commercially available electromechanical DTG instruments are capable of meeting a high level of performance, i.e., stability in the range of about 0.01 degree/hour. However, such devices consist of many hand assembled and costly conventionally machined parts and are relatively labor intensive to manufacture. Of course, such devices are more expensive than the 0.1 degree/hour devices to produce. Conventional electromechanical DTGs have high parts count and high labor input due to the many assembly and fine trimming operations required in their production. Their size and weight, about 2 in$^3$, 100 gm, are attractive verses previous instruments, such as the floated gyroscope, but they are still relatively large for many applications.

An alternative to the typical mechanical gyroscope is a all micro-machined gyroscope, made from silicon, which tends to be smaller and less expensive than the typical electromechanical gyroscopes. An example of an all micro-machined gyroscope is the tuning fork gyroscope (TFG) by The Charles Stark Draper Laboratory, Inc., Cambridge, Mass. The all micro-machined TFG performs at only a moderate level of performance, about 10–100 degree/hour, and it is projected that it will take many years to improve performance to the better than 1 degree/hour level. So, with respect to performance, the all micro-machined gyroscope lags behind typical mechanical devices and, therefore, is primarily suited for applications requiring a small sized gyroscope with moderate performance.

Many gyroscopes are gas filled, having a gas generally occupying the volume within the case. Rotation of the rotor within the case causes pressure gradients and turbulence, which adversely effect the performance of the gyroscope. The gyroscope's vulnerability to such disturbances is referred to as "gas fill pressure sensitivity". Despite such sensitivities, it is still typically considered advantageous to fill conventional DTG's, for example, with a gas at a fill pressure of, optimally, not more than 1/10 of atmosphere. At the same time, it is desirable, although not practical, to allow rotation of the rotor subassembly about the fixed drive shaft using a gas bearing, which has inherent low noise and long life characteristics. However, gas bearings typically require a fill pressures of 3 to 4 atmospheres, i.e., quite a bit higher than the fill pressure optimally required for the rotor subassembly.

It would be advantageous to have a gyroscope comprised of low cost, high volume components which performs at least as well as expensive traditional mechanical gyroscopes, but at significantly reduced size and weight. It would also be advantageous to substantially eliminate the gas fill pressure sensitivity of the gyroscope by substantially eliminating the pressure gradients and turbulence to which the rotor subassembly is subjected. Furthermore, it would be advantageous to take advantages of gas bearings within such a device, without compromising the performance of the gyroscope.

SUMMARY OF THE INVENTION

The present invention is a hybrid wafer gyroscope comprised of micro-machined components and, potentially, conventional machined components, all of which are manufacturable by known low cost, high volume techniques. As a minimum, the hybrid wafer gyroscope includes a rotor subassembly micro-machined (e.g., etched) from a conductive wafer material, such as silicon. The rotor subassembly includes at least a micro-machined rotor and gimbal, and preferably a drive hub if two degrees of freedom are required. Each micro-machined component may be formed from one or more layers of wafer material. In the preferred form, the gyroscope includes an induction drive motor, including stators that may also be micro-machined from wafer material. The remainder of the gyroscope may include more traditional electro-mechanical components, such as a housing, a drive shaft, and other drive motor components. As an example, due to the relatively small micro-machined rotor subassembly, the overall size and weight of a DTG hybrid wafer gyroscope in accordance with the present invention, is about five a times smaller than typical machined DTGs. Additionally, a gyroscope in accordance with the present invention is capable of improved performance, having a stability of up to about 0.005 degree/hour. Of course, larger size and weight hybrid wafer gyroscopes may also be constructed, as dictated by the application for which the gyroscope is to be used. Because all of the gyroscope components are made from low cost, high volume techniques, the cost of a hybrid wafer gyroscope is about half that of similarly performing electromechanical gyroscopes.

The hybrid wafer gyroscope includes a housing substantially encasing and securing a pair of disk shaped stators in a parallel orientation, but offset within their respective planes from each other by about 90°. The stators are separated at a fixed distance by a ring shaped spacer disposed circumferentially therebetween. This combination defines a circular volume within which the rotor subassembly rotates about a fixed drive shaft, defining a spin reference Z-axis. Each stator is secured to the housing, which includes a top case and a bottom case. Within each case a circular arrangement of motor windings is housed, centered about the spin reference Z-axis. Rotation of the rotor subassembly between the stators and with respect to the drive shaft is facilitated using one of a variety of forms of bearing. In alternate forms, the drive shaft, or a portion thereof, may be rotational rather than stationary, potentially obviating the need for the use of bearings between the rotor subassembly and drive shaft. Also, with alternate motive forms, the windings may not be necessary.

Assuming a fixed drive shaft and bearing arrangement, in a first rotor subassembly embodiment, the drive hub includes a groove, as an inner bearing raceway, centered about the spin reference axis. In such a case, secured within (or as part of) each stator is a bearing plate which includes a corresponding outer bearing raceway. When assembled, the inner and outer bearing raceways nest a plurality bearing balls, thereby forming a ball bearing between the rotor subassembly and the drive shaft. In a second rotor assembly embodiment, a self-contained bearing mechanism, such as a cartridge bearing, may be coupled the rotor subassembly and thereby allow rotation with respect to the drive shaft. Other forms of bearing and rotation facilitating interfaces known in the art may be employed in alternate embodiments.

As part of the motive source which causes the rotation of the rotor subassembly, a magnet or series of magnets is coupled to or integral with the rotor subassembly and uniformly distributed about the spin reference axis. For example, in one form, the drive hub includes a plurality of magnet seats having magnets secured therein. In another embodiment, a magnet hub (i.e., a ring of magnets) is coupled to the rotor subassembly. The radius from the Z-axis to the center of the circular arrangement of windings is about equal to the radius from the Z-axis to the center of the circular magnet or arrangement of magnets. Together, the windings, a power source connected to the windings, and the magnet(s) form the motive source which rotates the rotor subassembly.

One side of each stator, the side that faces the rotor subassembly, is generally divided into four quadrants and includes pick-offs and torquers. The pick-offs, torquers, and control electronics comprise the substantive portion of a control feedback loop that senses displacement of the rotor and adjusts for such displacements. Within each quadrant of each stator is a pair of arcuate capacitive pick-offs pads, concentric with the Z-axis, for sensing a displacement from a null position of the rotor as a function of the voltage between the rotor and pick-off pads. The pick-off pads are electrically isolated from each other and have separate leads which connect to separate pads at the outer circumference of their corresponding stator, for connection to the control electronics. The pick-off pads are disposed radially proximate to the outer half of the rotor. In a similar arrangement, within each quadrant of each stator is a pair of arcuate torquer pads concentric with the Z-axis for applying a nulling force to the rotor in response to voltage differences sensed by the pick-offs. The torquer pads are electrically isolated from each other and have separate leads which connect to pads at the outer circumference of their corresponding stator for connection to the control electronics. The torquer pads are disposed radially proximate to the inner half of the rotor. The stators also define several holes for securing together the components of the gyroscope and they define several cutouts at the outer circumference, some of which are metalized and form torquer and pick-off connection pads.

In the preferred embodiment the rotor subassembly includes a drive hub, gimbal, and rotor formed as a series of substantially coplanar concentric rings centered about the spin reference axis, preferably etched from a single silicon wafer. The gimbal is connected to the drive hub via two flexures formed between the two and along a gimbal-shaft pivot X-axis, which is orthogonal to the Z-axis. The rotor is attached to the gimbal via two flexures formed between the two and along a rotor-gimbal pivot Y-axis, which is orthogonal to the X and Z axes. Formed between the outer circumference of the drive hub and the inner circumference of the gimbal, and opposite to each other with respect to the Z-axis and along the Y-axis, are circular stop cutouts, within which stops are seated to limit or dampen the rotor deflection. Similarly, stop cutouts are formed between the gimbal and rotor along the X-axis and opposite each of other with respect to the Z-axis. Otherwise, the hub-gimbal and gimbal-rotor interfaces are formed by semicircular cuts on the wafer. Preferably, the stop cutouts and flexures are also etched into the silicon wafer during etching of the other rotor subassembly components.

In an alternate embodiment, the rotor subassembly is hermetically sealed within a gas-filled bearing cartridge having a gas pressure of up to about 1/10 atmospheres, wherein the cartridge is rotatable with respect to the drive shaft. In such an embodiment, the bearing cartridge includes two disk shaped couplers disposed in parallel planes on each side of the planar rotor subassembly, wherein the inner circumferences of the couplers are sealed together by a cylindrical inner spacer and the outer perimeters of the couplers are sealed together by a cylindrical outer spacer. Rotation of the cartridge with respect to the drive shaft is preferably accomplished using a bearing. In the preferred form, the bearing is a gas bearing. The bearing cartridge experiences a coincident rotation with the rotor subassembly. Consequently, there is a reduction of gas fill sensitivity of the gyroscope because the gas is rotating with the rotor, such that pressure gradients and turbulence within the cartridge are substantially nonexistent. The pressures within the bearing cartridge and outside the cartridge may be varied, but it is essential in hybrid wafer gyroscope embodiments including the bearing cartridge that the pressure within the cartridge is isolated and independent from the pressure outside the cartridge.

The couplers are micro-machined disks including pick-off couplers and torquer couplers disposed proximate to the rotor subassembly. The couplers are concentric with the rotor subassembly and have an inner perimeter substantially equal to that of the rotor subassembly. The outer perimeter of each coupler is slightly larger, radially, than the rotor subassembly and is coupled to a different edge of the outer spacer. Each coupler is divided into quadrants which include arcuate capacitive pick-off and torquer couplers oriented about the spin reference axis to be proximate to corresponding stator pick-offs and torquers. The pick-off couplers couple signals corresponding to displacements of the rotor to their corresponding stator pick-offs. Similarly, each torquer coupler couples signals from its corresponding stator to the rotor to correct rotor displacements. In an alternative approach, a circular band is used on the outside of the rotor to couple signals between the rotor and stators. In the preferred embodiment bearing cartridge embodiment, the bearing cartridge includes a circular arrangement of magnets which interact with the motor windings. Given that the rotor subassembly is coupled to the bearing cartridge, rotation of the cartridge causes coincident rotation of the rotor subassembly.

In an alternate approach, optical pick-offs are used in place of capacitive pick-offs. In such an embodiment, at least a portion of each stator and coupler is formed from an optically transparent material, wherein light is directed at an angle from a light emitting or laser diode through the glass and onto the rotor. The reflection of light from the rotor is measured by a quad cell to determine rotor displacement. Displacement signals are then communicated to the control electronics. For increased accuracy, an interferometer may be used in place of the quad cell.

BRIEF DESCRIPTION OF THE DRAWINGS

The foregoing and other objects of this invention, the various features thereof, as well as the invention itself, may be more fully understood from the following description when read together with the accompanying drawings, wherein.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENTS

Figure 1A:
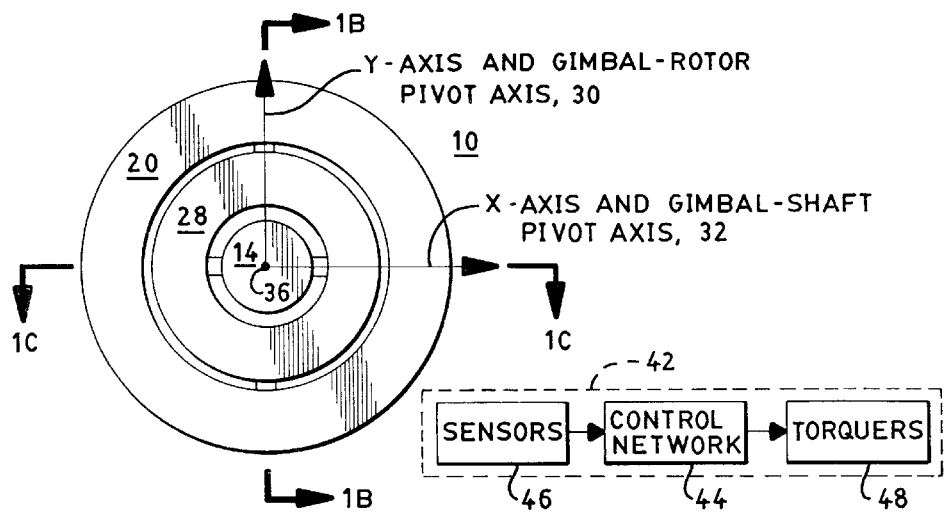
FIGS. 1A–1C are diagrammatic views of a prior art electromechanical dynamically tuned gyroscope.
Figure 1B:
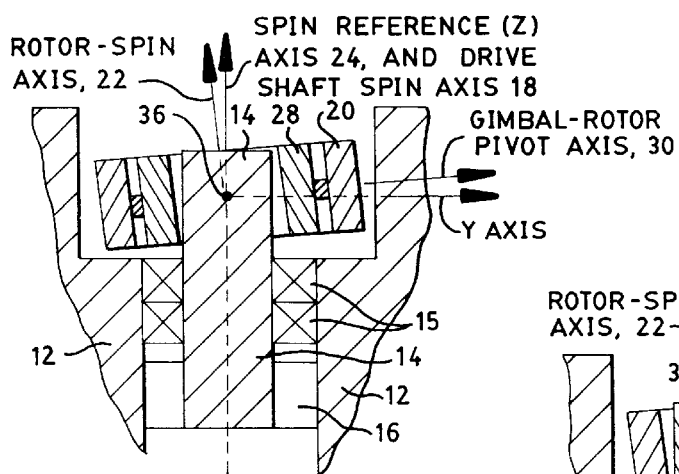
Figure 1C:
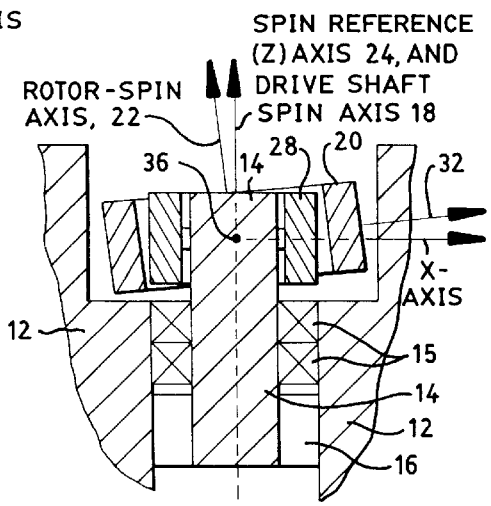

The present invention is a hybrid wafer gyroscope, including a combination of micro-machined components and more traditional electromechanical components. In the preferred embodiment, the hybrid wafer gyroscope includes a unitary and substantially planar rotor, gimbal, and drive hub etched from a single micro-machinable wafer, referred to as a rotor subassembly. Conceptually, proven micro-machining techniques typically used in producing integrated circuits are adapted to produce the rotor subassembly and other micro-machined parts. Consequently, parameters like alignment, balance, and uniformity of the unitary rotor subassembly are all much more easily attained than with the manufacture of typical mechanical rotors and gimbals, such as those shown in FIGS. 1A–1C. Tight tolerances are inherent in the micro-machining technology and processes, which are known to be highly precise and much less dependent on operator skills than the processes involved in the typical machining of mechanical parts like rotors and gimbals. Among other things, the hybrid wafer gyroscope takes advantage of the precision allowed by micro-machining of the critical rotating components (e.g., rotor, gimbal, and drive hub) while also taking advantage of the reliability and producability of more traditional components (e.g., motor and drive shaft). In each case, the components lend themselves to relatively low cost, high volume production while also yielding a gyroscope which lends itself to miniaturized form and has exceptional performance, for example, stability of up to about 0.005 degrees/hour.

Figure 2:
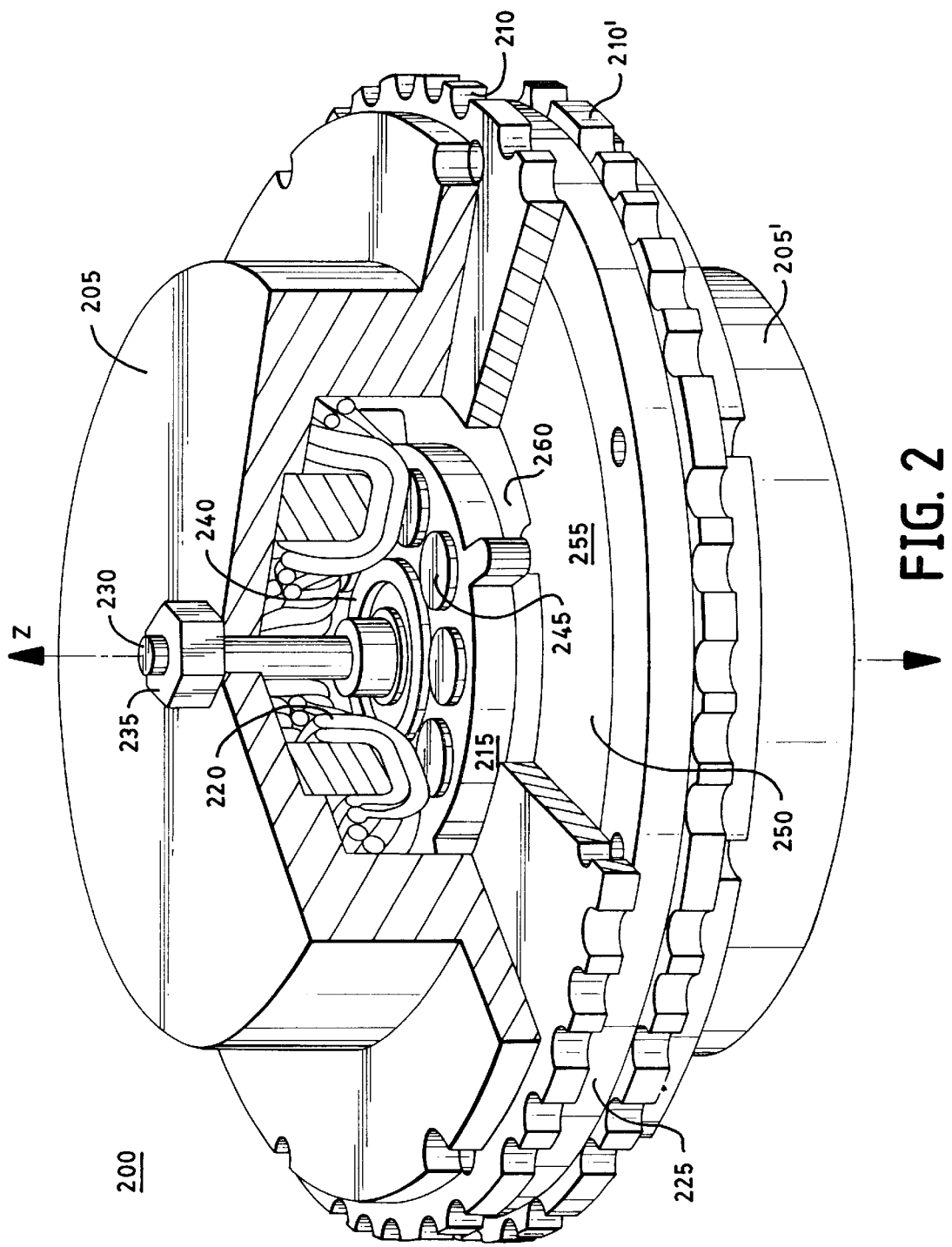
FIG. 2 is a partial cut-away view of a preferred embodiment of the hybrid wafer gyroscope in accordance with the present invention.

FIG. 2 shows a partial cutaway, assembled, perspective view of a preferred embodiment of a hybrid wafer gyroscope 200, in accordance with the present invention. Gyroscope 200 includes a rotor subassembly 250, which rotates about a spin reference Z-axis within a fixed housing, and a motor. The housing includes two substantially identical portions, a top case 205 and a bottom case 205'. In the preferred form, the top and bottom cases are formed from 400 series stainless steel. Each one of a pair of disk shaped stators, stators 210 and 210' respectively, is coupled to either of the top case 205 or bottom 205' case. In assembled form, a relatively narrow ring shaped spacer 225 is sandwiched between the stators and has an outer radius approximately the same as the outer radius of each stator. Spacer 225 is made from a non-conductive material, such as a ceramic or glass-ceramic, and has a thickness slightly greater than that of rotor subassembly 250. The combination of cases, stators, and spacer are oriented concentrically and define a generally circular internal volume within which rotor subassembly 250 rotates in a generally parallel orientation with respect to stators 210 and 210', and circumscribed by spacer 225. Rotor subassembly 250 rotates about a drive shaft 230, through which passes the spin reference Z-axis, lengthwise. Drive shaft 230 is held in place non-rotatably by nut 235 at the external surface of top case 205 and in a comparable manner at an external surface (not shown) of bottom case 205'.

As part of an electromagnetic motor of gyroscope 200, a pair of current carrying windings is disposed about the spin reference Z-axis. A first winding 220 is disposed in top case 205 and a second winding is similarly disposed in bottom case 205' (shown in FIG. 3). Two corresponding substantially circular magnet hubs also comprise portions of the motor of gyroscope 200. A first magnet hub 215 is coupled a top side of a drive hub portion of rotor subassembly 250 and a similar second magnet hub (not shown) is coupled to a bottom side (not shown) of the rotor subassembly. Consequently, the hubs and rotor subassembly 250 rotate together. Each of the magnet hubs (e.g., hub 215) of the gyroscope embodiment shown in FIG. 2 houses a plurality of circular magnets 245 in a circular arrangement about the spin reference Z-axis (and drive shaft 230). Generally, the radius from the spin reference Z-axis to the center of each magnet is about equal to the radius from the spin reference Z-axis to the center of the motor windings, e.g., windings 220. As is known in the art, this geometry facilitates electro-magnetic field interaction between windings 220 and magnets 245. A pair of conventional cartridge bearings (e.g., cartridge bearing 240) is used to allow the rotor subassembly/magnet hub combination to rotate about and relative to drive shaft 230. That is, a different bearing cartridge is coupled to each magnet hub and spins about drive shaft 230 in response to an electro-magnetic field generated by the motor windings and experienced by magnets 245. Bearings 240 may be made out of conventional bearing materials, such as 440C or 52–100 steels, and assembled within a cartridge and attached to the rotor subassembly during a pre-load operation of gyroscope assembly. In yet another embodiment, a standard angular contact bearing could be used. The use of standalone bearings allows for the balancing of the rotor and bearing assembly prior to attachment to the stators.

Figure 3:
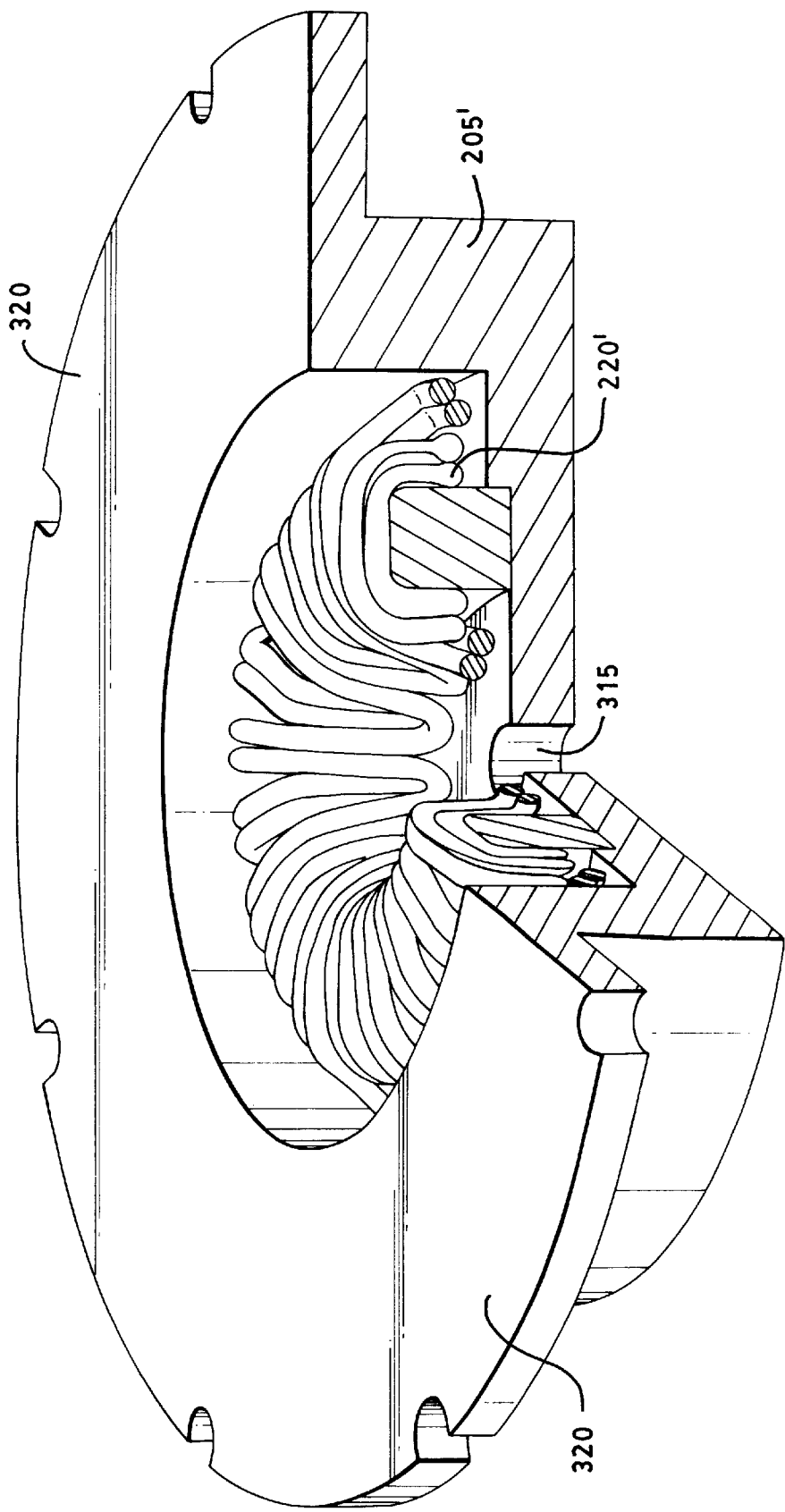
FIG. 3 is a partial cut-away perspective view of a case and winding subassembly of FIG. 2.

There are several approaches which may be used to implement the electro-magnetic induction drive motor and its motor windings. For example, a single ray or multiple turn winding motor is preferred, where the start and finish of each turn is led to the outer circumference of the stator where the winding interconnections are made. Such an implementation is shown in the partially cutaway perspective view of FIG. 3, which shows bottom case 205' and windings 220' of FIG. 2, for illustrative purposes. In this form, stator 210' of FIG. 2 would be secured to a mount face 320 of bottom case 205' when gyroscope 200 is assembled. In FIG. 3, winding 220' is encased within case 205' and ultimately connected to a power source (not shown) located external to the case. A circular opening 315 is formed centrally in case 205', i.e., at its intersection with the spin reference Z-axis, to accommodate the passage of the drive shaft (not shown) through case bottom 205' and ultimately through windings 220 and 220', stators 210 and 210', rotor subassembly 250, and top case 205.

In another embodiment having a different motor, a multilayer multiple turn winding may be used, wherein additional layers may be added in a multiple layer ceramic stator alternative. A ceramic multiple layer stator greatly reduces the number of connections and provides a relatively simple, low cost configuration. In yet another alternative configuration, a separate ferrite and laminated core back iron, with single or multiple layer windings, may be used. In this embodiment, the windings become a separate piece with respect to the housing. Also, as will be appreciated by those skilled in the art, a conventional wire wound stator coil could also be used in this configuration. For the most part, the principles for various motor embodiments are well known in the art and not discussed in detail herein.

Figure 4:
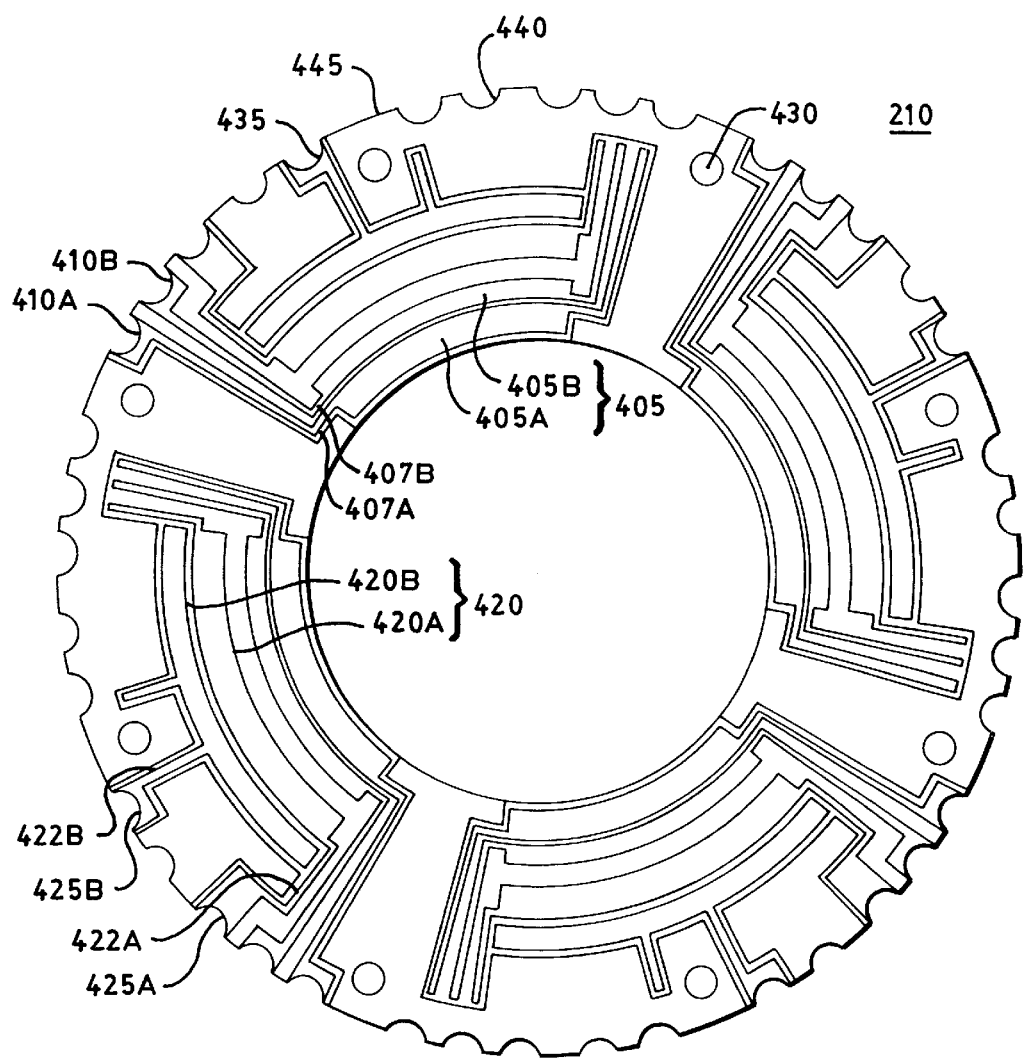
FIG. 4 is a top view of a stator that may be used with the hybrid wafer subassembly of FIG. 2.

A top view of stator 210 is shown in FIG. 4. As shown, stator 210 includes a pair of pick-offs 420 and a pair of torquers 405. Stator 210' is substantially the same as stator 210, and each is preferably constructed from either ceramic or a nonconductive metal. In the preferred embodiment, pick-offs 420 are dual capacitive pick-offs. The capacitive pick-offs sense displacement of a rotor (e.g., rotor 525 of FIGS. 5A and 6A, B) with respect to the stators and about a gimbal-rotor pivot X-axis (see FIG. 6B) as a function of the voltage between the rotor and the pick-offs 420. In the preferred form, two pick-offs, a first pick-off 420A and a second pick-off 420B, are integrated into each quadrant of stator 210. Each pick-off of a pick-off pair 420 is arcuate and concentric, having a certain width, wherein radii (i.e., inner and outer) of each pad originate at the spin reference Z-axis. The inner radius of the first (i.e., innermost) pick-off 420A is slightly greater than the outer radius of a second (i.e., outermost) torquer 405B, from the pair of torquers 405. The outer radius of the second pick-off 420B is about equal to the outer radius of the rotor. The two pads 420A and 420B of a pair of pick-offs are electrically isolated from each other, and include leads 422A and 422B to connection pads 425A and 425B located at the outer circumference of stator 210. Pads 425A and 425B provide connection to control electronics (not shown). Together, the pick-offs 420 in each quadrant of each stator help maintain zero voltage at all points on the rotor as the sensing portion of a control feedback loop. That loop also includes the torquers and control electronics. In an alternative embodiment, single pads may be used to simplify the electronics, but at some expense to performance. The pick-offs 420A and 420B of the preferred embodiment are deposited as thin metallic films using standard techniques.

Figures 5A, 5B:
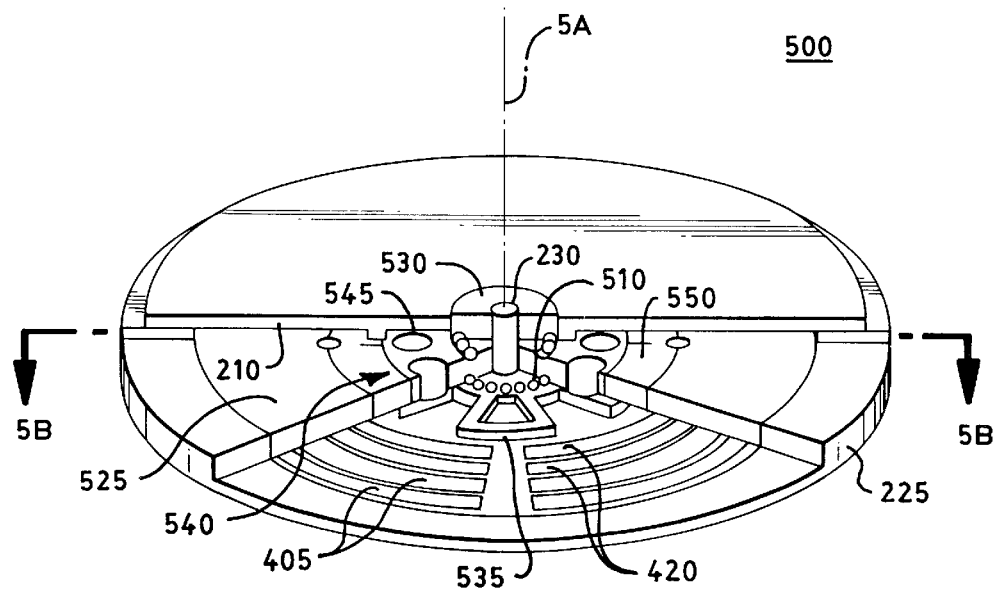
FIG. 5A is a partial cut-away perspective view of the preferred embodiment of a hybrid wafer subassembly.
FIG. 5B is a simplified cut-away sideview of the hybrid wafer subassembly of FIG. 5A.

In the preferred embodiment, torquers 405 are dual capacitive torquers. These torquers are integrated into each of four quadrants on each of the two stators, and are generally grouped with a pair of pick-offs within each quadrant. The capacitive torquers 405 apply a nulling force to the conductive rotor in response to a sensed displacement by pick-offs 420. Torquers 405 are in the form of dual (or a pair of) pads, i.e., first pad 405A and second pad 405B. Pads 405A and 405B are arcuate and concentric, having a predetermined width. The radii (i.e., inner and outer) of each pad extend from the spin reference Z-axis, and each radius of the second pad 405B is at least slightly longer than the radius of first pad 405A. Additionally, the inner radius of the first pad 405A is about equal to the inner radius of its corresponding rotor 525 of rotor subassembly 550 (as shown in FIG. 5A). The outer radius of the second (i.e., outermost) pad 405B is slightly less than the inner radius of the inner most pick-off 420A. The two pads of a pair of dual torquer pads 405 are electrically isolated from each other. Each pad includes an independent lead 407A and 407B to separate electrical pads 410A and 410B, respectively, located at the outer circumference of stator 210. Pads 410A and 410B connect to control electronics. Together, the torquer pads of the stators help maintain zero voltage at all points on the rotor, as part of the control feedback loop, by applying a corrective electromagnetic force to the rotor. In another embodiment, single torquer pads can be used, resulting in simplified electronics, but at the expense of some measure of performance. The torquers 405 of the preferred embodiment are deposited as then metallic films in the desired geometries using standard techniques. In an alternative embodiment, multiple layer ceramic stators may be used, wherein all leads lead to a single location.

Stator 210 includes a plurality of other features, in addition to pick-offs 420A and 420B, torquers 405A and 405B, and their associated leads. For example, eight connection holes 430 are formed in stator 210 and used to enable the securing together of the stators, cases, and spacer, with the rotor subassembly disposed between the stators. The eight connection holes 430 play no roll in the electromagnetic dynamics of the gyroscope, so need not be metalized. However, holes 430 may be metalized if for some reason that is desirable, for example, if it simplifies production of the stators. Additionally, ten cutouts per quadrant are formed around the outer perimeter of stator 210. Of the forty.total cutouts, sixteen cutouts 435 (including 410A, 410B, 425A and 425B) are metalized with a conductive material. Each of metalized cutouts 435 constitute the outer electrical pads and termination points of the leads originating from torquers 405 and pick-offs 420. Each cutout 435 includes conductive metalization over its outer edge for improved connection to the control electronics. The twenty four remaining cutouts 440 are not metalized, but they may be if, for example, it makes the manufacturing process easier. These cutouts 440 serve the purpose of wire bonding pads, but are generally considered to be optional. The non-cutout portions 445 of the outer circumference are not metalized.

FIG. 5A shows a perspective, partial cut-away view of an exemplary hybrid wafer gyroscope subassembly 500, incorporating a different bearing mechanism than the embodiment of FIG. 2. In this embodiment, the hybrid wafer gyroscope subassembly 500 includes a micro-machined rotor subassembly 550 having a bearing raceway (i.e., raceway 635 of FIG. 6A) formed within its drive hub (i.e., drive hub 605 of FIG. 6A). The wafer gyroscope subassembly 500 includes ring shaped spacer 225 for keeping the first stator 210 and the second stator 210' fixed in a parallel spaced relation to each other, above and below the planar rotor subassembly 550, as shown in FIG. 5B. Like rotor subassembly 550, the stators are substantially disk shaped. As is shown in FIGS. 5A and 5B, in assembled form the hybrid wafer gyroscope subassembly 500 includes a layering of first stator 210, rotor subassembly 550, and second stator 210'. First stator 210 is affixed to a first rim of spacer 225. Rotor subassembly 550, which is coupled to drive shaft 230, is offset along the spin reference Z-axis in a substantially parallel plane above the first stator 210, as shown in FIG. 5B, and rotatable with respect thereto.

Furthermore, the second stator 210' is affixed to a second rim of spacer 225, opposite the first stator 210 by spacer 225. The second stator 210' is offset below rotor subassembly 550 and in fixed relation to the first stator 210. The first and second stators 210 and 210' are substantially identical, but rotated 90 degrees with respect to each other within their respective parallel planes. In this embodiment, each stator 210 and 210' also includes a stator spacer 535 which preserves at least a minimum distance between the rotor subassembly and stator pick-offs and torquers. Additionally, magnets 540 are secured within magnet seats 545 of rotor subassembly 550. In response to a field produced by motor coils (not shown), the magnets, cause rotation of the rotor subassembly 550, as previously described.

In the embodiment of FIG. 5A, each stator includes an opening 505 at its center within which a disk shaped bearing plate is secured, e.g., bearing plate 530 secured within stator 210. A similar bottom bearing plate (not shown) is secured within stator 210 in substantially the same manner. The outer circular edge of bearing plate 530 forms a tight seal with the inner edge of circular opening 505 of stator 210, and the bearing plate is concentric with its corresponding stator. A circular opening is formed at the center of each bearing plate to accommodate insertion of drive shaft 230, which extends through the common center of stators 210 and 210', rotor subassembly 550, and the bearing plates, and is centered along the drive shaft axis, which is also the spin reference Z-axis. While the bearing plate 530 is shown as a separate component in FIG. 5A, each bearing plate could alternatively be formed as part of its corresponding stator. An outer raceway, substantially similar to corresponding inner bearing raceway 635 of the rotor subassembly (shown in FIG. 6) is formed in each bearing plate. In this embodiment, the bearing is formed by assembling the silicon raceway with the bearing plate and having bearing balls 510 nested within the raceways. The use of silicon results in bearings which experience relatively low wear and tear and have a long life span. Also, this configuration allows for rotor balancing prior to assembly of the gyroscope. The bearing of FIGS. 5A–5B and 6A–6B is an alternative to the cartridge bearing shown in the embodiments of FIG. 2.

Figure 6A:
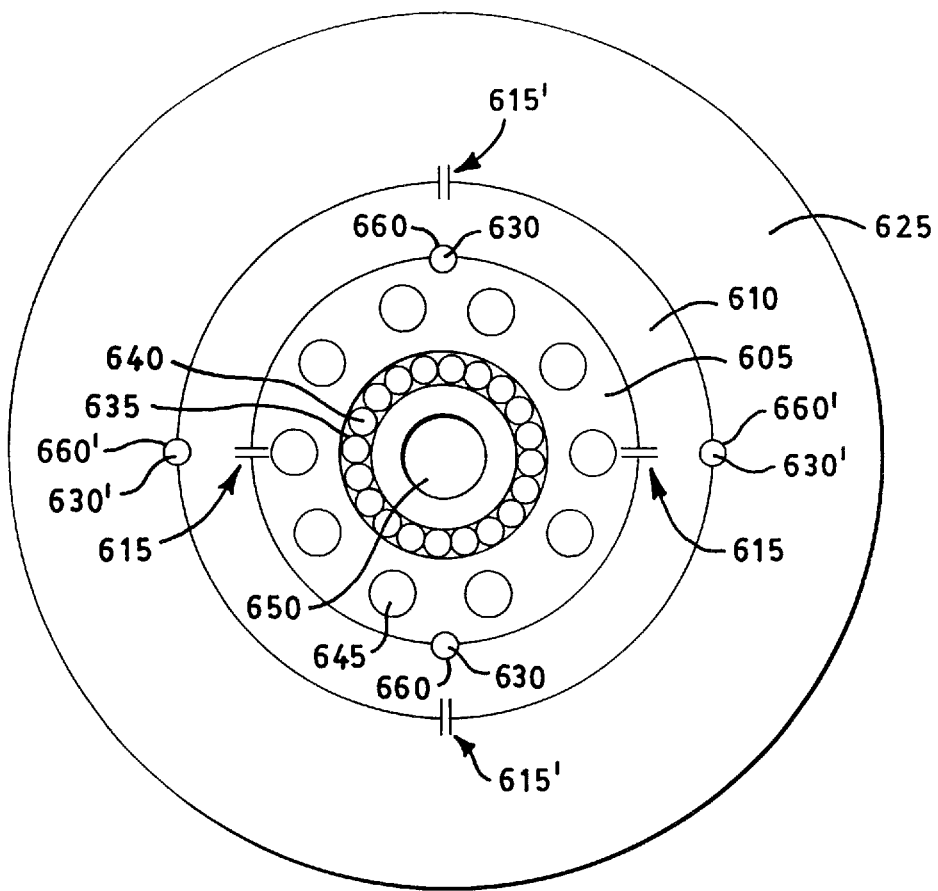
FIG. 6A is a top view diagram of a unitary planar rotor subassembly in accordance with the preferred embodiment of the present invention.

FIG. 6A shows a top view of rotor subassembly 550 of FIGS. 5A and 5B. Rotor subassembly 550 includes an integral rotor 625 (i.e., rotor 525 of FIG. 5A), gimbal 610, drive hub 605, and flexures 615, 615'. However, it would also be within the scope of the present invention to micro-machine, for example, only the rotor and gimbal or to introduce other similar variations to the hybrid wafer gyroscope concept. As shown, drive hub 605 of this embodiment includes accommodations for bearings and portions of a drive motor subassembly. However, in other embodiments (e.g., the embodiment of FIG. 2), the rotor assembly need not accommodate bearings or portions of a drive motor subassembly; rather, these components could be of more traditional forms. In the preferred form, rotor subassembly 550 is substantially a planar disk etched out of a single piece of micro-machinable material, e.g., silicon. Although, in other embodiments, the rotor subassembly may include a plurality of etched micro-machinable layers coupled together. Preferably, the rotor subassembly has a thickness of about 500 to 600 micrometers.

Central to rotor subassembly 550 is ring shaped drive hub 605, which is centered about a drive shaft axis (i.e., the spin reference Z-axis of FIG. 6B), wherein the drive shaft axis is orthogonal to the planar surface of the rotor subassembly 550 and, therefore, to drive hub 605. A circular drive shaft opening 650 is formed at the center of drive hub 605 to facilitate attachment of the rotor subassembly 550 to a drive shaft (not shown). The drive shaft is substantially cylindrical and disposed lengthwise about the drive shaft axis, similar to that shown in FIGS. 2 and 5A. Formed within the drive hub 605 is an inner bearing raceway 635. Inner bearing raceway 635 takes the form of a groove concentric with drive hub 605 and about the spin reference Z-axis (when assembled), and so is part of the unitary rotor subassembly 550 and preferably formed using micro-machining techniques. Seated within inner bearing raceway 635 is a series of bearing balls 640 (i.e., bearing balls 510 of FIG. 5A), wherein inner bearing raceway 635 is a track within which bearing balls 640 move as the rotor subassembly 550 spins with respect to the drive shaft and a pair of stators (see FIG. 5A). Additionally, the preferred form of the drive hub 605 includes ten circular magnet seats 645 formed about the circumference of a circle which is concentric with drive hub 605 and, therefore, about the spin reference Z-axis. When in assembled form, circular magnets are fixed within magnet seats 645 and comprise part of the motive mechanism for rotating the rotor subassembly 550.

Figure 6B:
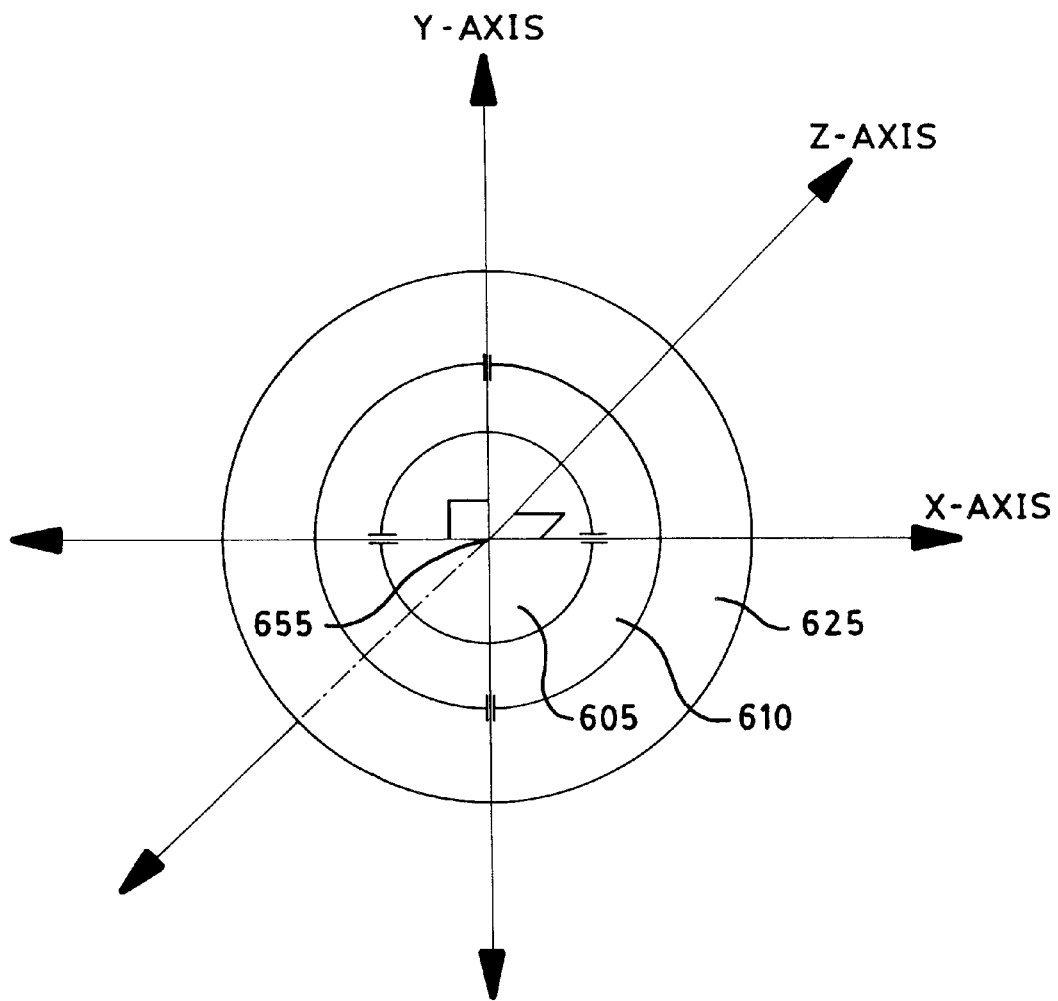
FIG. 6B is a top view diagram of a simplified rotor subassembly and its relevant axes.

A micro-machined ring shaped gimbal 610 is formed about the drive hub 605, and is concentric with hub 605. Gimbal 610 is attached to drive hub 605 using two micro-machined flexures 615, but gimbal 610 and drive hub 605 are otherwise separated by narrow semicircular micro-machined cuts. Flexures 615 are formed along a gimbal-shaft pivot X-axis which intersects with the drive shaft axis (or spin reference Z-axis) and is orthogonal thereto, as shown in FIG. 6B. Similarly, a micro-machined ring shaped rotor 625 is formed about gimbal 610. Rotor 625 is attached to gimbal 610 by two micro-machined flexures 615', but the rotor 625 and gimbal 610 are otherwise separated by narrow semicircular micro-machined cuts. Flexures 615' are formed along a gimbal-rotor pivot Y-axis, which is orthogonal to the spin reference Z-axis and orthogonal to the gimbal-shaft pivot X-axis. In the preferred embodiment, the flexures are thin, having low stiffness, so the rotor requires a low tune speed, or may not require tuning at all, to achieve a free rotor condition. The stiffness of the flexures can be varied by varying their thicknesses and/or width.

Two pairs of stop cutouts 660 and 660' are also formed within rotor subassembly 550. In the preferred form, two pairs of stops, 630 and 630', are seated within the circular stop cutouts 660 and 660', respectively. The stop cutouts 660 and 660' are formed during the micro-machining process, but could also be formed by alternate methods after the micro-machining of rotor 625 and gimbal 610. One pair of stops 630 is seated between the drive hub 605 and gimbal 610 along the gimbal-rotor pivot Y-axis at opposite segments of the semicircular cuts that separate the two. In a similar manner, the second pair of stops 630' are seated between the gimbal 610 and rotor 625 along the gimbal-shaft pivot X-axis at opposite segments of the semicircular cuts that separate the two. The stops 630 and 630' are used to limit or damp deflection of the rotor.

As with the prior art, the intersection of the X, Y and Z axes is referred to as the "pivot point" 655 of the gyroscope, shown in FIG. 6B. Rotor 625 spins about a rotor-spin axis, which is collinear with the spin reference Z-axis, unless the rotor experiences a rotation about the gimbal-rotor pivot Y-axis. In that case, the rotor-spin axis and spin reference Z-axis diverge about the pivot point. Flexures 615 and 615' allow the gimbal 610 to rotate relative to drive hub 605 in one case and allow the rotor 625 to rotate relative to gimbal 610 in a second case. Rotation of the gimbal 610 occurs about the gimbal-shaft pivot X-axis, while it spins about the rotor-spin axis. Rotation of the rotor 625 occurs about the gimbal-rotor pivot Y-axis, while it spins about the rotor-spin axis. Accordingly, the rotor subassembly 550 shown in FIGS. 6A and 6B, and generally shown herein, is part of a gyroscope having two degrees of freedom. When the rotor and gimbal rotate in the same plane, the rotor is said to be "nulled".

The planar geometry of the rotor subassembly 550 yields mass moment of inertia properties of the rotor and gimbal that produce a gyroscope with a very high "figure of merit" (FOM). The FOM of a gyroscope is approximately equal to the rotor spin axis inertia divided by the cross axis (in plane) inertia of the gimbal, and is a measure of the degree to which the rotor is isolated from the bearing and drive shaft angular run-out disturbances. A relatively high FOM, generally indicates a relatively better inertial stability of a gyroscope rotor. Conventional, bulk sized, single gimbaled DTG's, for example, have FOM's ranging from 30–200. However, a hybrid wafer DTG in accordance with the present invention has an FOM of well over 1000, a benefit, in part, of the rotor subassembly's planar construction. Such a high FOM reflects that a hybrid wafer gyroscope has a minimum sensitivity to bearing vibration inputs, so it is more stable than gyroscopes having lower FOMs. Additionally, the hybrid wafer gyroscope has a low aspect ratio rotor which maximizes angular momentum while minimizing mass. Accordingly, in the case of a DTG, for example, the hybrid wafer gyroscope has the highest FOM of any known single gimbal DTG for its given rate (which is about 200 degrees/s) and its "g" capabilities (i.e., greater than 10,000 along the axial direction).

Figure 7A:
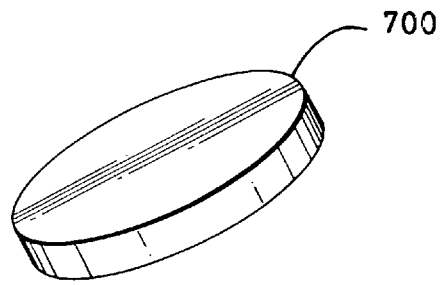
FIG. 7A is a perspective view of a stator and bearing cartridge assembly including the rotor subassembly of FIG. 2.
Figure 7B:
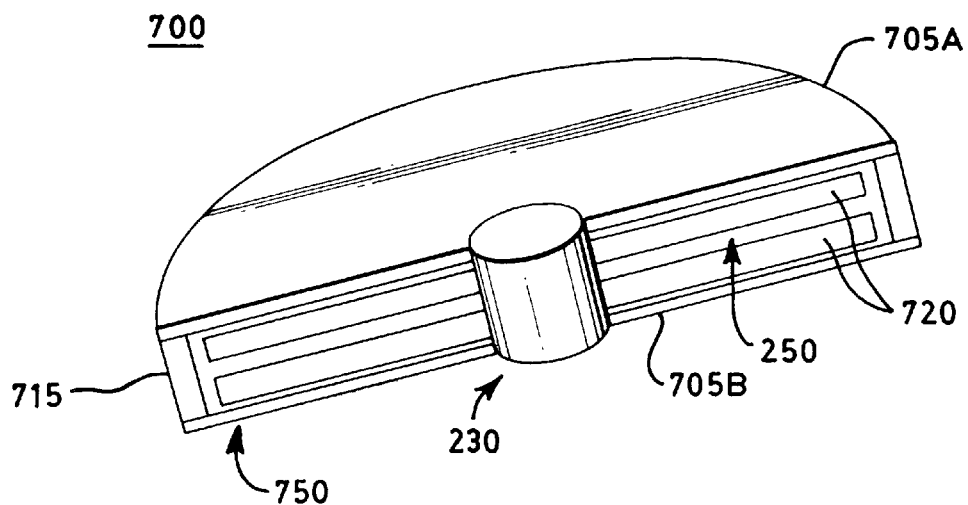
FIG. 7B is a cut-away perspective view of the assembly of FIG. 7A.
Figure 7C:
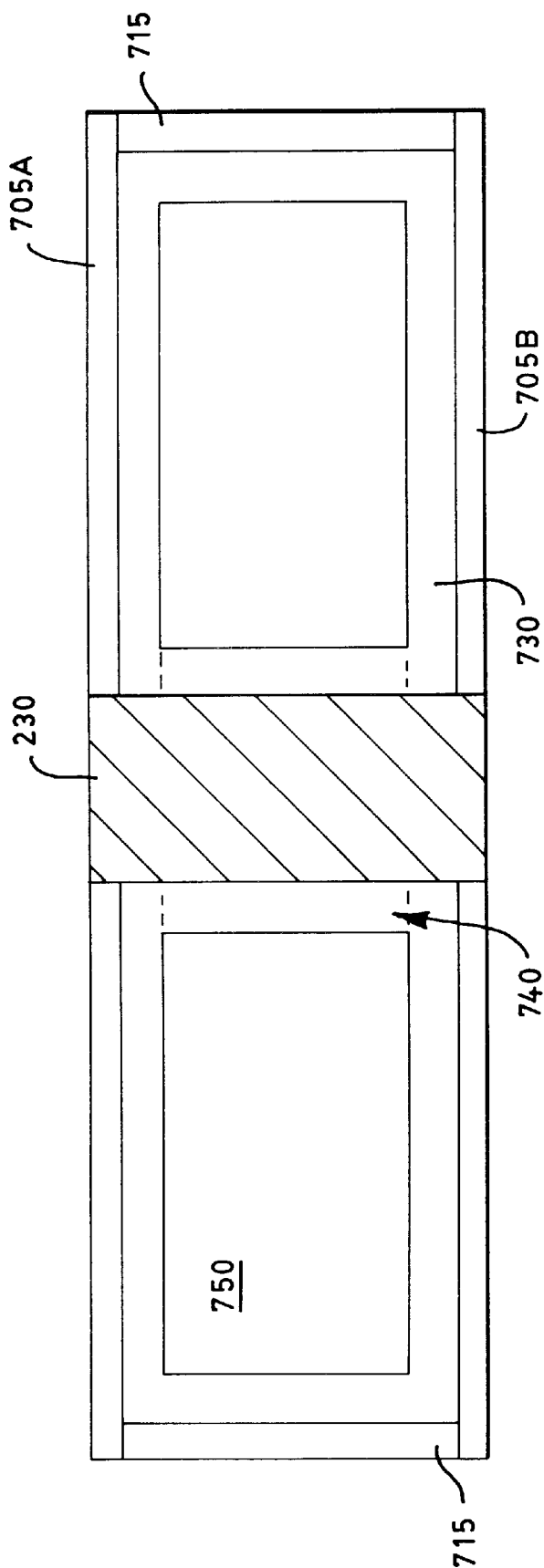
FIG. 7C is a cross-sectional side view of the assembly of FIG. 7A.

In an alternate embodiment, rotor subassembly 250 of FIG. 2 is hermetically sealed within a gas-filled bearing cartridge, which is rotatably disposed between two stators, as shown by assembly 700 in FIGS. 7A, 7B, and 7C. Assembly 700, in preferred form, is about 1.1 inches in diameter and about 0.2 inches thick. Sealing the rotor subassembly within the bearing cartridge allows the environment within which the rotor subassembly rotates to be controlled, consequently enhancing performance of the hybrid wafer gyroscope. The gas pressure within the cartridge is preferably chosen to be up to about 1/10 atmospheres. As another means of controlling the environment within which the rotor subassembly spins, the cartridge 750 and rotor subassembly 250 rotate together. Therefore, pressure gradients and turbulence within the gyroscope and with respect to the rotation of the rotor subassembly, which might otherwise degrade performance, are substantially eliminated.

Figure 8:
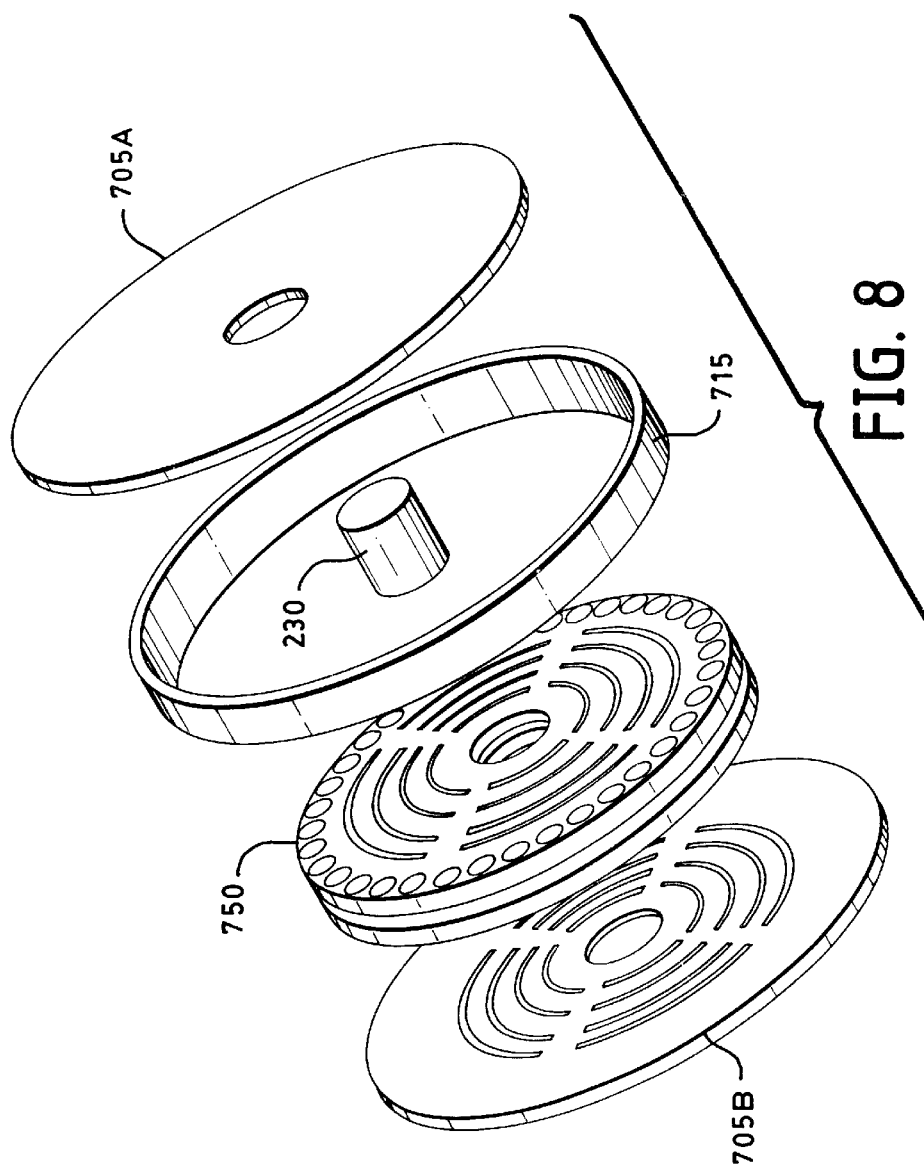
FIG. 8 is an exploded view of the assembly of FIGS. 7A and 7B.

As is apparent from the cut-away views of FIG. 7B and FIG. 7C and the exploded view of FIG. 8, cartridge 750 rotates about drive shaft 230 within the volume defined between stators 705A and 705B. Each stator is substantially disk shaped with a center drive shaft opening, and includes torquers and pick-offs, similar to the stator shown FIG. 4. Preferably, stators 705A and 705B are micro-machined from silicon. As with previously described hybrid wafer gyroscope embodiments, at the perimeter of the stators, a spacer 715 keeps the stators in a parallel orientation and at a fixed distance apart. Spacer 715 is preferably formed from a non-conductive material, such as silicon nitride. Through the center of each stator passes the spin reference Z-axis, although the stators remain fixed with respect to rotor subassembly 250 and bearing cartridge 750. To accomplish rotation of bearing cartridge 750, a drive shaft opening 740 is defined through which drive shaft 230 passes. A bearing facilitates the rotation of bearing cartridge 750 with respect to drive shaft 230. In the preferred form, the bearing is a gas bearing, wherein a gas fill pressure of 3 to 4 atmospheres is preferably maintained between the inner circumference of the bearing cartridge (i.e., at its drive shaft opening) and drive shaft 230. In other embodiments, an alternate bearing may be used. The gas fill pressure within the bearing cartridge and the pressure used for the gas bearing may be varied, but in any event, the gas fill pressure within the bearing cartridge remains independent of the pressure otherwise present within the hybrid wafer gyroscope.

Figure 9:
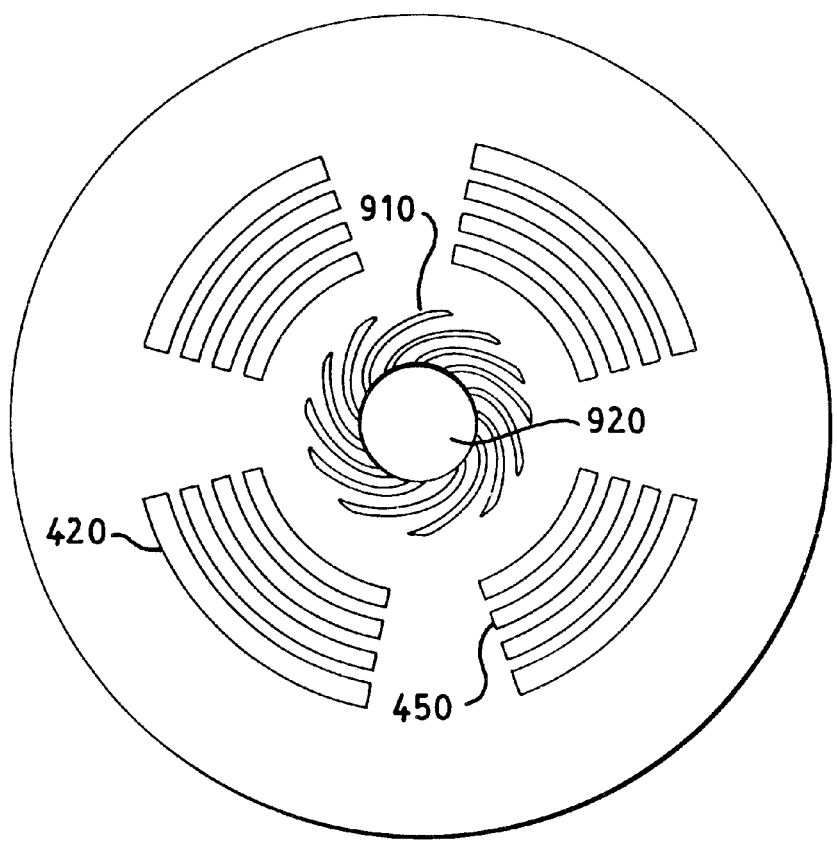
FIG. 9 is a top view of a stator included in the assembly of FIG. 8.

As shown in FIG. 9, each stator (here stator 705A) includes four pairs of torquers 405 and four corresponding pairs of pick-offs 420. As with previous embodiments, separate pairs of torquers and pick-offs are disposed in each of four quadrants of the stator. When using a gas bearing between the bearing cartridge and the drive shaft, each stator additionally includes a gas bearing thrust pad 910 circumscribing a drive shaft opening 920 of the stator. Each thrust pad has the form of a spiral originating from the spin reference axis, and formed in the surface of the stator proximate to the bearing cartridge. Therefore, a thrust pad is formed just below and just above the interface of drive shaft 230 and bearing cartridge 750. The thrust pads have mirrored spiral patterns to facilitate the channeling of gas into the gas bearing area from one side and out of the gas bearing area from the opposite side.

Figure 10A:
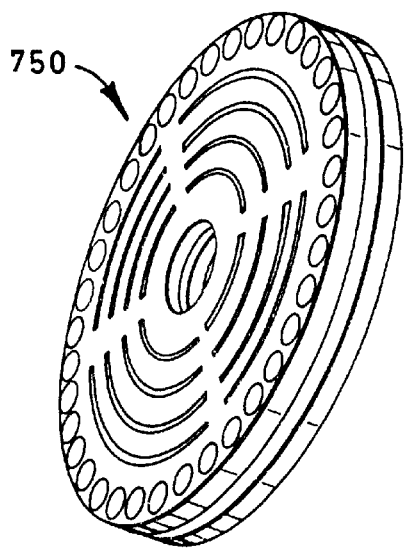
FIG. 10A is a perspective view of the bearing cartridge assembly of FIG. 8.
Figure 10B:
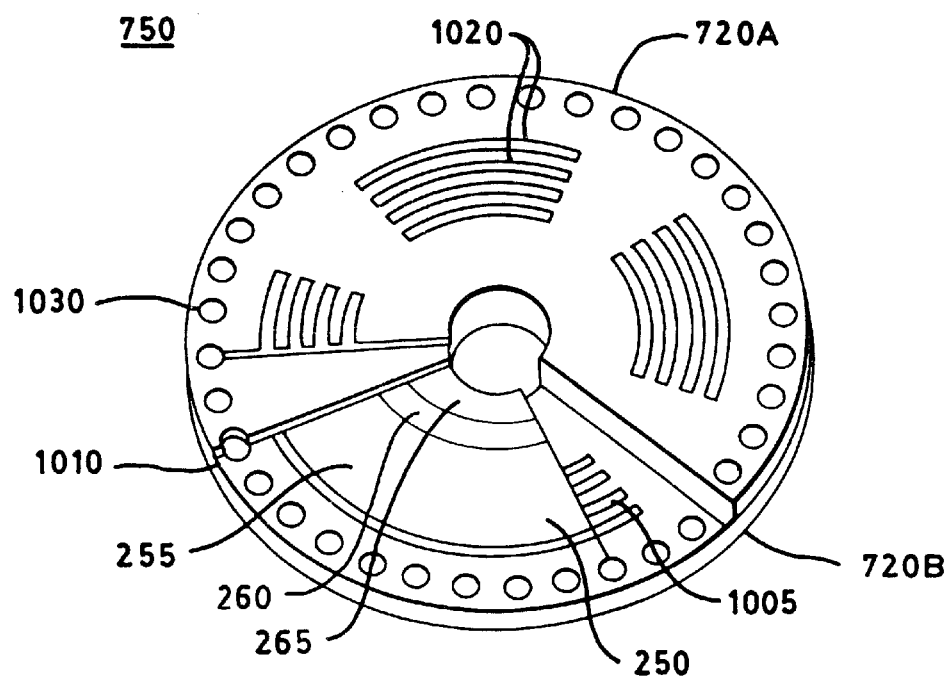
FIG. 10B is a partial cut-away view of the bearing cartridge assembly of FIG. 10A.
Figure 10C:
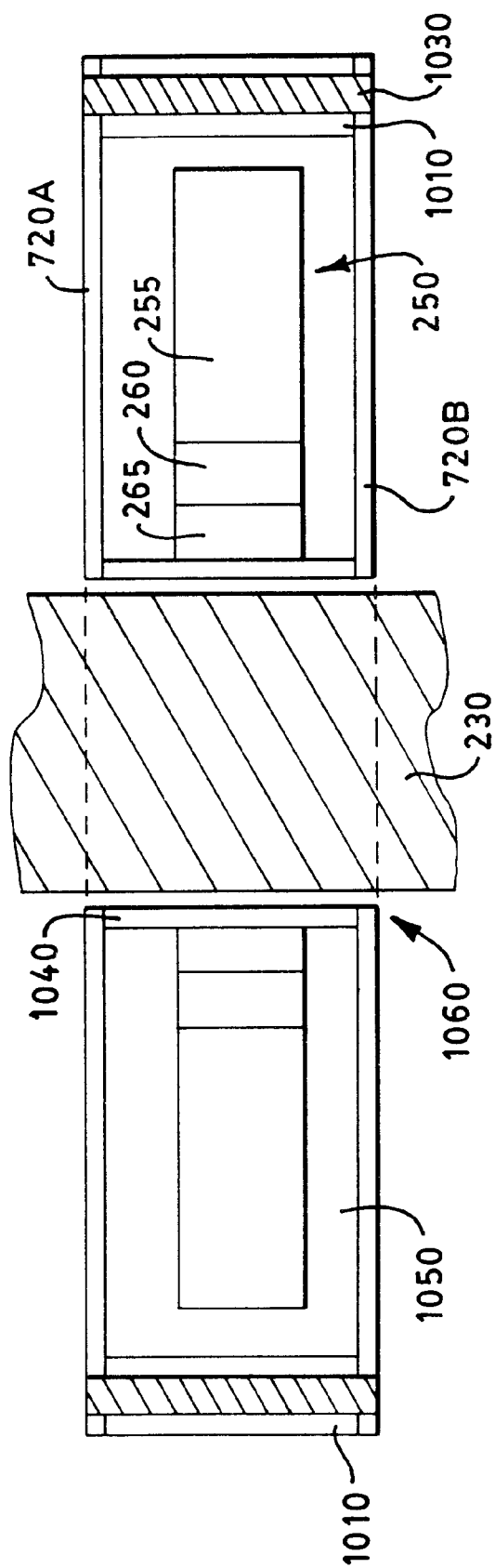
FIG. 10C is a cross-sectional side view of the bearing cartridge assembly of FIG. 10A.

In FIG. 10A the assembled bearing cartridge 750 of FIG. 8 is shown in a perspective view, while the actual composition of bearing cartridge 750 is shown in cut-away and cross-sectional views in FIGS. 10B and 10C. Bearing cartridge 750 is substantially comprised of layered circular components centered (and rotational) about the spin reference axis. Bearing cartridge 750 includes two substantially similar couplers 720A and 720B which are substantially planar disk shaped components micro-machined and disposed in parallel with the rotor subassembly 250 and stators 705A and 705B. The rotor subassembly is sandwiched between the couplers, with sufficient clearance for the gimbal 260 and rotor 255 of the rotor subassembly to experience rotation about the gimbal-shaft pivot X-axis and the gimbal-rotor pivot Y-axis, respectively. A ring shaped spacer 1010, having an outer perimeter or circumference substantially the same as that of each coupler is positioned between the couplers and maintains them in a fixed parallel spaced relation to each other. The spacer and the outer portions of each coupler 720A and 720B accommodate a series of magnets 1030 which extend substantially through bearing cartridge 750. In this embodiment, rather than coupling or integrating magnets with rotor subassembly 250, the magnets integrated with the bearing cartridge are used, driven by induction, to spin the entire bearing cartridge 750, including the rotor subassembly 250.

Corresponding to the pick-offs and torquers of the stators, each coupler includes pairs of capacitive pick-off couplings and torquer couplings disposed in quadrants about each coupler. The capacitive pick-off couplings sense displacements of the rotor portion 255 of rotor subassembly 250 and couple a signal corresponding to such a displacement to the pick-offs of the stators. Similarly, the torquer couplings couple signals from stator torquers to the rotor 255 of the rotor subassembly to correct any displacements thereof. Because each coupler acts as an interface between its corresponding stator and one side of the rotor subassembly, each coupling is located on each side of the coupler (or extends through the coupler) and is physically proximate, both radially and in angular orientation with respect to the spin reference axis, to its corresponding stator and to one side of the rotor subassembly.

Rotor subassembly 250 is sealed between couplers 720A and 720B using cylindrical spacers 1010 and 1040, shown in the cross-sectional view of FIG. 10C. Spacer 1040 seals the internal circumference of the bearing cartridge (i.e., couplers) and rotor subassembly such that gas within the bearing cartridge 1050 is not lost at this junction. Since the rotor subassembly is also coupled to the inner spacer, it rotates coincidentally with the bearing cartridge. Spacer 1010 accomplishes a similar seal between the outer perimeters of the couplers. Therefore, the gas fill pressure is maintained and pressure gradients and turbulence are substantially non-existent when the gyroscope is in use. Spacer 1040 is radially slightly larger than drive shaft 230 when a gas bearing is used as the rotation means for the bearing cartridge with respect to the drive shaft. In the small gap 1060 remaining between the drive shaft and spacer 1040, gas is forced via the thrust pads of the stators, as previously described. Use of a gas bearing is preferred because gas bearings are known to inherently create less noise and to be longer lasting. However, other bearings may also be used in other embodiments.

Figure 11:
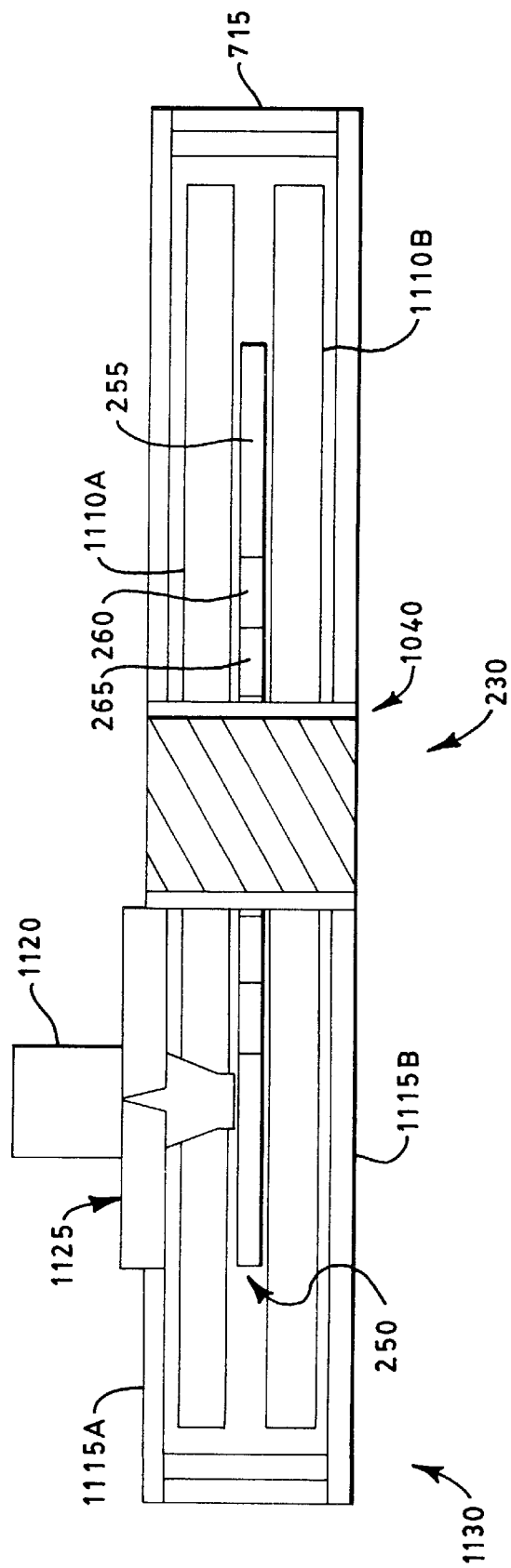
FIG. 11 is a cross-sectional side view of a stator and bearing cartridge assembly having optical pick-offs.

FIG. 11 shows an alternate embodiment which employs optical pick-offs and a bearing cartridge 1130. In such an embodiment, light from a light source (e.g., an LED) 1120 is directed through a stator 1115A to the rotor subassembly 250 and the reflected light is then detected by a quad cell 1125 to determine the displacement of the rotor portion 255. In such a case, a pair of bearing cartridge couplers 1110A and 1110B, at least in the region of the optical path of the light source 1120, must be optically transparent. For example, the couplers, or at least a portion thereof, may be formed from pyrex. Also, the stators 1115A and 111B must accommodate the transmission of light by similarly including an optically transparent window or opening. As with the former embodiments of the hermetically sealed bearing cartridge, the gas pressure within the bearing cartridge is maintained independent of the gas pressure outside of the cartridge and within the gyroscope generally.

Generally, the invention may be embodied in other specific forms without departing from the spirit or central characteristics thereof. That is, while the preferred embodiment of the present invention is described with respect to a hybrid wafer gyroscope, it should be understood that the present invention lends itself to tuned gyroscopes (e.g., DTGs) and non-tuned gyroscopes. For example, the present invention lends itself to gyroscopes which need not be tuned, because the rotor assembly has relatively low stiffness, so spinning allows precession without substantial elastic restraint. Also, those skilled in the art will appreciate that any of a variety of bearings can be incorporated into the gyroscope in a variety of ways, whether part of the rotor assembly or not. Similarly, any of a variety of drive motors could be used with the present invention. As an alternative to the use of rotor subassembly magnets in the preferred embodiment, a hysteresis ring may be used, as will be appreciated by those skilled in the art. Also, while the rotor subassemblies shown herein are single micro-machined components, a rotor subassembly could also be made from a plurality of micro-machined layers coupled together. The present embodiments are.therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A hybrid wafer gyroscope comprising:
   A. a closed housing disposed about a substantially cylindrical shaped inner region, said inner region extending along a spin axis,
   B. a drive shaft supported by said housing along said spin axis,
   C. a micro-machined unitary planar sheet rotor subassembly disposed within said inner region, said rotor subassembly being generally disk shaped and coaxial with said spin axis, and having:
      (i) a central hub portion coupled to said drive shaft and extending about said spin axis;
      (ii) an annular gimbal portion at a periphery of the hub portion; and
      (iii) an annular rotor portion at a periphery of the gimabl portion, wherein said gimbal portion is coupled to said hub portion by flexures permitting relative angular motion of said gimbal portion and said hub portion about a first reference axis perpendicular to and intersecting said spin axis, and
   wherein said gimbal portion is coupled to said rotor portion by flexures permitting relative angular motion between said gimbal portion and said rotor portion about a second reference axis perpendicular to and intersecting said spin axis, said second reference axis being perpendicular to said first reference axis,
   D. a drive assembly including means for driving said rotor subassembly to rotate about said spin axis, wherein said drive shaft is fixed relative to said housing and said drive assembly includes at least one bearing that allows said rotor subassembly to rotate with respect to said drive shaft and
   E. a sensor assembly including means for generating signals representative of displacements of said rotor portion of said rotor subassembly relative to a reference plane perpendicular to said spin axis.

2. A gyroscope according to claim 1 wherein the rotor subassembly is substantially comprised of silicon.
   (vi) a first circular groove formed in said bottom planar surface of said central drive hub portion of the same radius as, and concentric with said first bearing plate circular groove and concentric with said rotor subassembly; and
   wherein a plurality of bearing balls may be nested within said first circular groove and said first bearing plate circular groove, such that said rotor subassembly is rotatable with respect to said drive shaft.

3. A gyroscope according to claim 1 wherein the rotor subassembly is comprised of a plurality of layers, including layers of conductive materials.

4. A gyroscope according to claim 1 wherein the rotor subassembly is further comprised of:
   (iv) a first stop disposed between said gimbal portion and said hub portion along the first reference axis; and
   (v) a second stop disposed between said gimbal portion and said hub portion along the first reference axis and 180 degrees from said first stop.

5. A gyroscope according to claim 1 wherein the rotor subassembly is further comprised of:
   (vi) a third stop disposed between said rotor portion and said gimbal portion along the second reference axis; and
   (vii) a fourth stop disposed between said rotor portion and said gimbal portion along the second reference axis and 180 degrees from said third stop.

6. A gyroscope according to claim 1 wherein the flexures are micro-machined cuts in said rotor subassembly.

7. A gyroscope according to claim 1 wherein the sensor assembly includes at least one capacitive pick-off which senses said displacement of said rotor portion relative to said reference plane as a function of a voltage between said at least one pick-off and said rotor portion.

8. A gyroscope according to claim 7 wherein said rotor subassembly has a top planar surface and a bottom planar surface and the forcer servo assembly includes at least one pick-off disposed proximate to said top planar surface and at least one pick-off disposed proximate to said bottom surface.

9. A gyroscope according to claim 1 wherein said rotor subassembly has a top planar surface and a bottom planar surface and said drive assembly includes:
   D. a first bearing, including:
      (i) a first circular groove formed in said bottom planar surface of said central drive hub portion and concentric with said rotor subassembly;
      (ii) a first bearing plate fixedly disposed relative to said drive shaft and having a circular groove of the same radius as, and concentric with said first circular groove; and
      (iii) a plurality of bearing balls nested within said first circular groove and said first bearing plate, such that said rotor subassembly is rotatable with respect to said drive shaft.

10. A gyroscope according to claim 9 wherein said drive assembly further including:
    D. a second bearing, including:
       (iv) a second circular groove formed in said top planar surface of said central drive hub portion and concentric with said rotor subassembly;
       (v) a second bearing plate fixedly disposed relative to said drive shaft and having a circular groove of the same radius as, and concentric with said second circular groove; and
       (vi) a plurality of bearing balls nested within said second circular groove and said second bearing plate, such that said rotor subassembly is rotatable with respect to said drive shaft.

11. A gyroscope according to claim 1 further comprising:
    F. a forcer servo assembly, including means responsive to said generated signals for nulling displacements of said rotor portion whereby said rotor portion is maintained nominally in said reference plane.

12. A gyroscope according to claim 11 wherein the forcer servo assembly includes at least one capacitive torquer which selectively generates an electromagnetic field in response to said generated signal, wherein said electromagnetic field is applied to said rotor portion for nulling displacements of said rotor portion of said rotor subassembly.

13. A gyroscope according to claim 12 wherein said rotor subassembly has a top planar surface and a bottom planar surface and the forcer servo assembly includes at least one torquer disposed proximate to said top planar surface and at least one torquer disposed proximate to said bottom surface.

14. A gyroscope according to claim 1 further comprising:
F. a hermetically sealed bearing cartridge, within which is contained the rotor subassembly, wherein the rotor subassembly is rotatably coupled to the drive shaft via the bearing cartridge.

15. A gyroscope according to claim 14 wherein the bearing cartridge is filled with a gas at a pressure up to about 1/10 atmospheres.

16. A gyroscope according to claim 14 wherein the bearing cartridge is coupled to the drive shaft via a gas bearing.

17. A gyroscope according to claim 16 wherein the gas bearing maintains a gas pressure between the bearing cartridge and drive shaft of about 3 to 4 atmospheres.

18. A gyroscope according to claim 14 wherein the hermetically sealed bearing cartridge includes:
(i) a first disk shaped, substantially planar coupler, having a first inner edge defining a first opening at its center and a first circular outer edge;
(ii) a second disk shaped, substantially planar coupler, having a second inner edge defining a second opening at its center and a second circular outer edge;
(iii) an outer ring shaped spacer, coupling and sealing said first coupler outer edge to said second coupler outer edge; and
(iv) an inner spacer, coupling and sealing said first inner edge, said second inner edge, and said rotor subassembly hub portion about said drive shaft.

19. A gyroscope according to claim 18 wherein said first coupler includes a pick-off coupling configured to communicate said signals representative of displacements of said rotor portion to said sensor assembly.

20. A gyroscope according to claim 19 wherein said sensor assembly is an optical sensor assembly having a light source and a light detector and said pick-off coupling is an optically transparent material, wherein light emitted from said light source passes through said optically transparent material and is incident on said rotor portion and said light detector senses light reflected back from said rotor portion and through said optically transparent material.

21. A gyroscope according to claim 19 further comprising:
G. a forcer servo assembly, including means responsive to said generated signals for nulling displacements of said rotor portion whereby said rotor portion is maintained nominally in said reference plane; and
wherein said first coupler includes a torquer coupling, including means responsive to said forcer server for nulling said displacements of said rotor portion.

22. A hybrid wafer gyroscope comprising:
A. a closed housing disposed about a substantially cylindrical shaped inner region, said inner region extending along a spin axis,
B. a drive shaft supported by said housing along said spin axis,
C. a micro-machined unitary planar sheet rotor subassembly disposed within said inner region, said rotor subassembly being generally disk shaped and coaxial with said spin axis, and having:
(i) a central hub portion coupled to said drive shaft and extending about said spin axis,
(ii) an annular gimbal portion at a periphery of hub portion; and
(iii) an annular rotor portion at a periphery of the gimbal portion,
wherein said gimbal portion is coupled to said hub portion by flexures permitting relative angular motion of said gimbal portion and said hub portion about a first reference axis perpendicular to and intersecting said spin axis, and
wherein said gimbal portion is coupled to said rotor portion by flexures permitting relative angular motion between said gimbal portion and said rotor portion about a second reference axis perpendicular to and intersecting said spin axis, said second reference axis being perpendicular to said first reference axis,
D. a drive assembly including means for driving said rotor subassembly to rotate about said spin axis, wherein said means for driving said rotor subassembly includes an induction motor and at least one magnet coupled to said rotor subassembly and
E. a sensor assembly including means for generating signals representative of displacements of said rotor portion of said rotor subassembly relative to a reference plane perpendicular to said spin axis.

23. A gyroscope according to claim 22 wherein said rotor subassembly central hub portion includes a plurality of magnet seats disposed substantially symmetrically about said spin axis, wherein one of said magnet is housed in each magnet seat.

24. A micro-machined unitary planar sheet rotor subassembly, for use in a gyroscope having a closed housing disposed about a substantially cylindrical shaped inner region, said inner region disposed along a spin axis, a drive shaft supported by said housing along said spin axis, and a drive assembly including means for driving said rotor subassembly about said drive shaft, said rotor subassembly comprising:
(i) a central hub portion coupled to said drive shaft and extending about said spin axis, wherein said drive assembly means includes an induction motor and said rotor subassembly central hub portion includes a plurality of magnet seats disposed substantially symmetrically about said spin axis, to accommodate the housing of a magnet in each magnet seat;
(ii) an annular rotor portion at a periphery thereof, and
(iii) an annular gimbal portion between said hub portion and said rotor portion,
wherein said gimbal portion is coupled to said hub portion by flexures permitting relative angular motion of said gimbal portion and said hub portion about a first reference axis perpendicular to and intersecting said spin axis, and
wherein said gimbal portion is coupled to said rotor portion by flexures permitting relative angular motion between said gimbal portion and said rotor portion about a second reference axis perpendicular to and intersecting said spin axis, said second reference axis being perpendicular to said first reference axis.

25. A rotor subassembly according to claim 24, wherein the rotor subassembly is substantially comprised of silicon.

26. A rotor subassembly according to claim 24, wherein the rotor subassembly is comprised of a plurality of layers, including layers of conductive materials.

27. A rotor subassembly according to claim 24, wherein the rotor subassembly is further comprised of:
   (iv) a first stop disposed between said gimbal portion and said hub portion along the first reference axis; and
   (v) a second stop disposed between said gimbal portion and said hub portion along the first reference axis and 180 degrees from said first stop.

28. A rotor subassembly according to claim 24, wherein the rotor subassembly is further comprised of:
   (iv) a third stop disposed between said rotor portion and said gimbal portion along the second reference axis; and
   (v) a fourth stop disposed between said rotor portion and said gimbal portion along the second reference axis and 180 degrees from said third stop.

29. A rotor subassembly according to claim 24, wherein the flexures are micro-machined cuts in said rotor subassembly.

30. A rotor subassembly according to claim 24 wherein said drive assembly includes a first bearing plate fixedly disposed relative to said drive shaft and having a circular groove formed therein centered about said drive shaft, wherein said rotor subassembly has a top planar surface and a bottom planar surface and includes:

31. A rotor subassembly according to claim 30 wherein said drive assembly includes a second bearing plate fixedly disposed relative to said drive shaft and having a circular groove formed therein centered about said drive shaft, wherein said rotor subassembly further includes:
   (v) a second circular groove formed in said top planar surface of said central drive hub portion of the same radius as, and concentric with said second bearing plate circular groove and concentric with said rotor subassembly; and
wherein a plurality of bearing balls may be nested within said second circular groove and said second bearing plate circular groove, such that said rotor subassembly is rotatable with respect to said drive shaft.

* * * * *

UNITED STATES PATENT AND TRADEMARK OFFICE
CERTIFICATE OF CORRECTION

PATENT NO. : 6,615,681 B1
DATED : September 9, 2003
INVENTOR(S) : Lyle J. Jenkins et al.

It is certified that error appears in the above-identified patent and that said Letters Patent is hereby corrected as shown below:

Column 15,
Line 37, delete the first word "gimabl", and insert therefore -- gimbal --;

Columns 15-16, line 60 in column 15 to line 2 in column 16,
Delete:
"(vi) a first circular groove formed in said bottom planar surface of said central drive hub portion of the same radius as, and concentric with said first bearing plate circular groove and concentric with said rotor subassembly; and
wherein a plurality of bearing balls may be nested within said first circular groove and said first bearing plate circular groove, such that said rotor subassembly is rotatable with respect to said drive shaft."

Column 20,
Line 4, after "includes:", insert:
-- (vi) a first circular groove formed in said bottom planar surface of said central drive hub portion of the same radius as, and concentric with said first bearing plate circular groove and concentric with said rotor subassembly; and
wherein a plurality of bearing balls may be nested within said first circular groove and said first bearing plate circular groove, such that said rotor subassembly is rotatable with respect to said drive shaft. --

Signed and Sealed this

Third Day of February, 2004

JON W. DUDAS
*Acting Director of the United States Patent and Trademark Office*